May 20, 1952 W. J. O'BRIEN 2,597,520

AUTOMATIC VOLUME CONTROL CIRCUITS

Filed Jan. 24, 1948 2 SHEETS—SHEET 1

INVENTOR.
WILLIAM J. O'BRIEN
BY
Walter P. Huntley
ATTORNEY

May 20, 1952 W. J. O'BRIEN 2,597,520

AUTOMATIC VOLUME CONTROL CIRCUITS

Filed Jan. 24, 1948 2 SHEETS—SHEET 2

INVENTOR.
WILLIAM J. O'BRIEN
BY Walter P. Huntley
Attorney

Patented May 20, 1952 2,597,520

UNITED STATES PATENT OFFICE 2,597,520

AUTOMATIC VOLUME CONTROL CIRCUITS

William Joseph O'Brien, London, England, assignor to The Decca Record Company, Limited, London, England, a corporation of Great Britain Application January 24, 1948, Serial No. 4,093
In Great Britain January 31, 1947

5 Claims. (Cl. 178—44)

Figure 1:
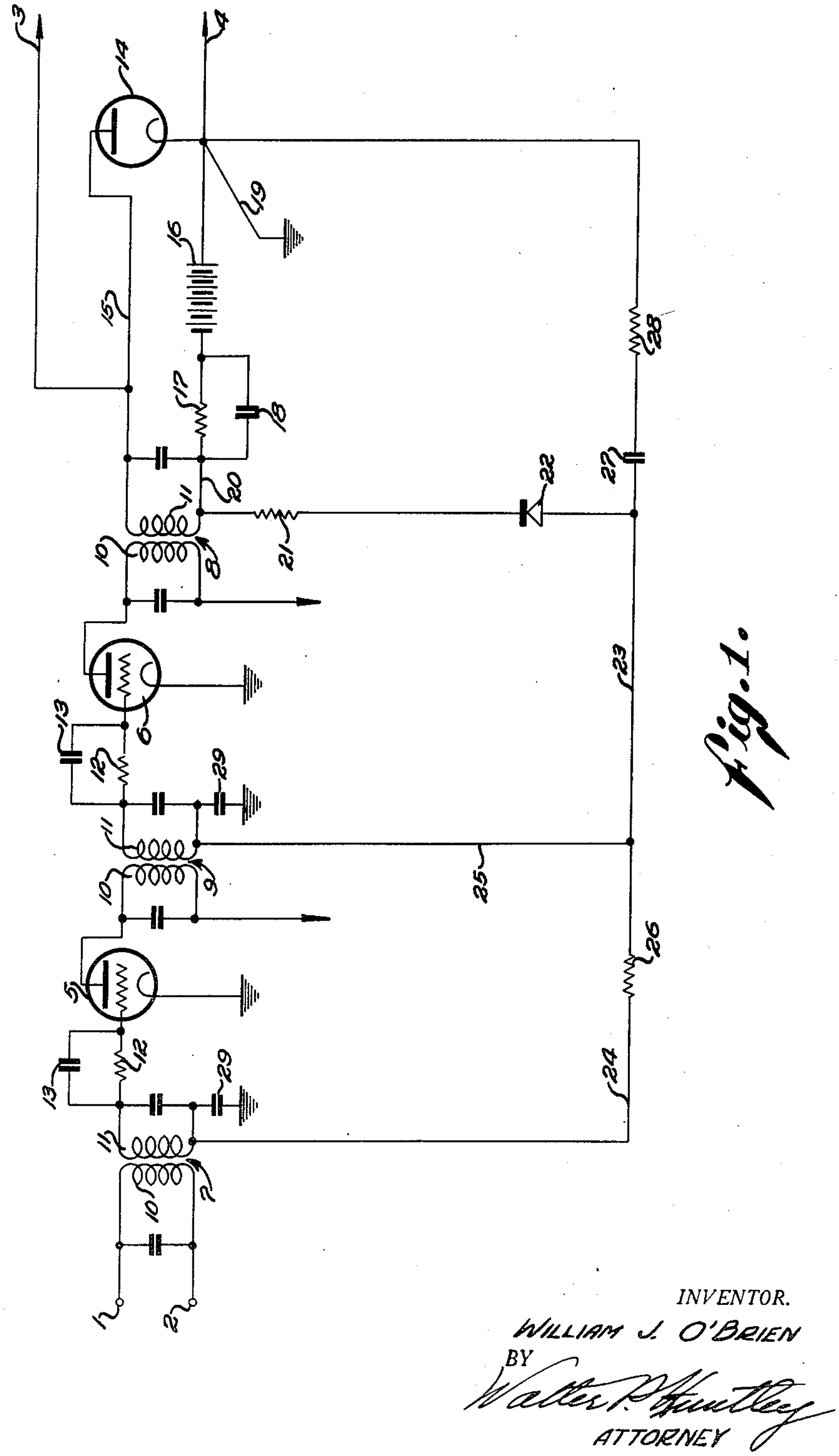

This invention relates to automatic volume control circuits, and has particular reference to a volume control circuit which permits operation of certain types of radio receiving apparatus in the presence of strong overriding intermittent interfering signals.

This invention finds particular utility when used with apparatus for receiving radio frequency navigational signals of the continuous-wave phase-comparison type such as is exemplified by the system disclosed in a copending application Serial No. 612,987, now abandoned, filed August 27, 1945, by William J. O'Brien, and entitled "Navigation System." In systems of the type referred to, operational difficulties are sometimes encountered as a result of strong interfering signals. If the interfering signals are of the same frequency as is employed by the navigational aid, the navigational aid may be rendered inoperative either because the interfering signals produce phase shifts in the received signals rendering the indicated phase relation completely erroneous, or because the receiver automatic volume control operates to so reduce the gain of the receiver as to reduce below a usable level the navigational signals passed by the receiver.

The most common source of such interfering signals in the case of navigational systems operating at low frequencies of the order of 100 kc. is radio telegraph stations operating on the same or nearby frequency. In certain cases the interfering signals may be received at a level many times higher than the level of the desired navigational signals. In such cases the conventional automatic volume control circuits operate to reduce the gain of the receiver to a value commensurate with the average level of the received signals, so that during the short intervals between each of the elements of the Morse transmission, the navigational signals, though present, are received at such a low level as to be useless. In the transmission of conventional Morse messages, slightly less than one half of the total time is used in radiating a signal, the balance comprising the spaces between individual elements of the code, spaces between complete letters, and the spaces between words. The present invention is directed to an improved automatic volume control circuit for navigational aid receivers which operates to permit the receiver to operate in these breaks between the elements of the Morse transmission.

It is therefore an object of this invention to provide an automatic volume control circuit for radio receivers which operates in the presence of strong overriding interfering signals to render the receiver inoperative for the duration of each individual element of the interfering signal, and to quickly restore the receiver to operation at the conclusion of each of said elements.

It is also an object of this invention to provide an automatic volume control circuit of the character referred to in the preceding paragraph which operates to maintain the gain of the receiver during periods of operation at a level substantially the same as though the interfering signals were not being received.

It is another object of this invention to provide an automatic volume control circuit of the character hereinbefore described in which the controlling potential is applied to the controlled tubes by means of a circuit exhibiting a higher resistance to currents flowing in one direction than to currents flowing in the opposite direction.

It is a still further object of this invention to provide an automatic volume control circuit of the character set forth in the preceding paragraph in which a crystal unit or other suitable asymmetric resistance is interposed in the circuit for applying the controlling potential to the controlled tubes.

It is also an object of this invention to provide an automatic volume control circuit of the character hereinbefore referred to in which limiter circuits are interposed in the signal circuits of at least one of the controlled tubes.

Figure 2:
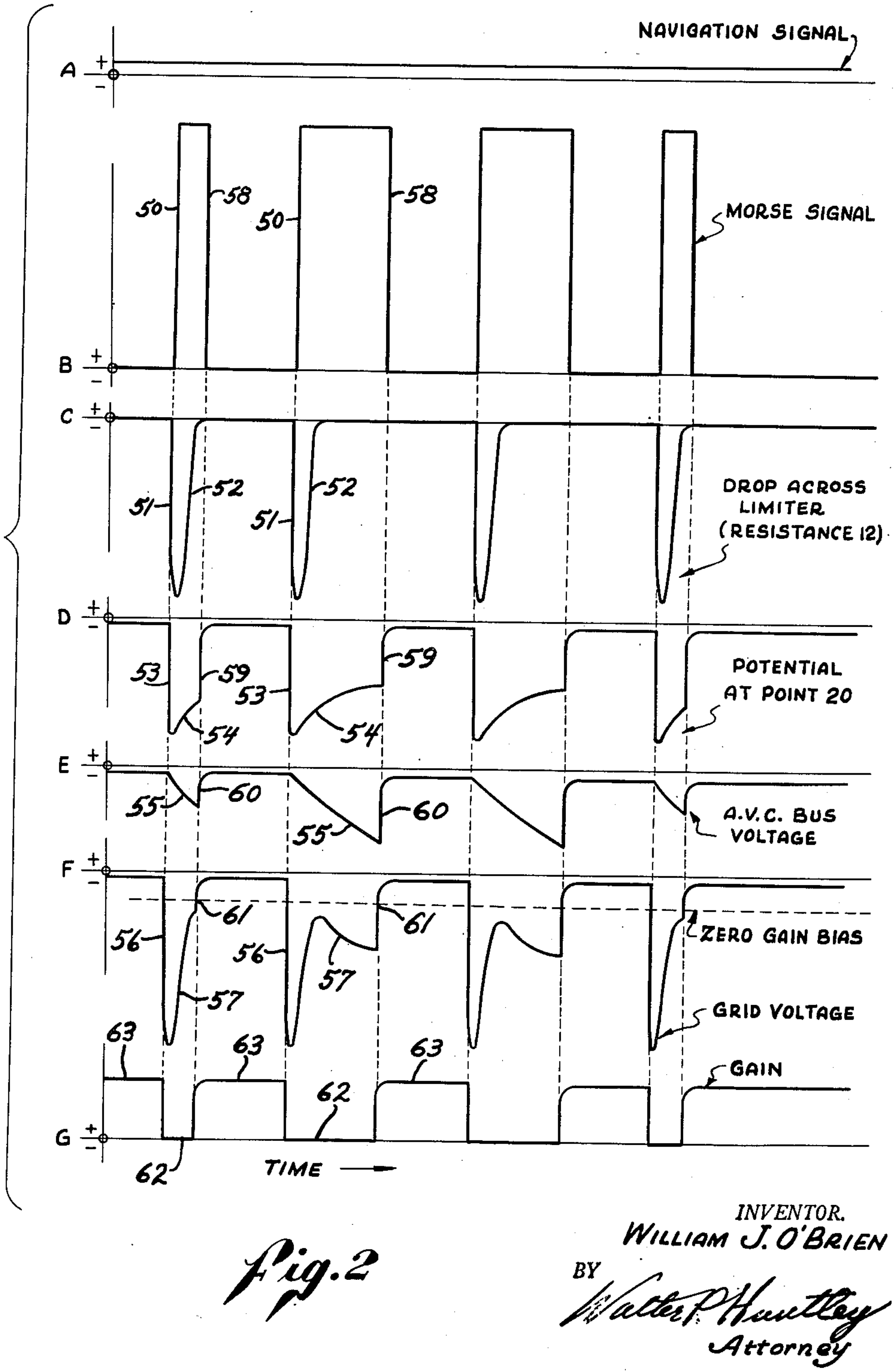

Other objects and advantages of this invention will be apparent from a study of the following specification, read in connection with the accompanying drawings wherein:

Fig. 1 is a schematic wiring diagram of a radio frequency amplifier embodying an automatic volume control circuit constructed in accordance with the preferred embodiment of this invention; and Fig. 2 is a chart illustrating diagrammatically the variations of the electrical potentials at certain points in the circuit of Fig. 1 under certain assumed operating conditions.

Referring to the drawings, there is illustrated in Fig. 1 a radio frequency amplifier comprising signal input terminals 1 and 2, and signal output terminals 3 and 4, a two-stage vacuum tube amplifier being interposed between the input and output terminals and consisting of tubes 5 and 6. In the drawing, triode type tubes have been illustrated for simplicity, but the invention is equally applicable to multi-grid tubes. Also, the heater circuits for the tubes have been omitted as the same are conventional and well known. For like reasons, sources of direct operating potential have been omitted, and downwardly pointing arrowheads have been used to indicate a connection to the positive terminal of a battery or other suitable source of direct operating potential. In the ensuing description, electrical values for certain of the components have been included parenthetically, not by way of limitation, but as an example of one of the circuit arrangements which may be used, it being understood that such values are subject to wide variation without altering the mode of operation of the circuit and without departing from the spirit of the invention.

The coupling of the input and output terminals to the amplifier and the interstage coupling may each be effected by means of radio frequency transformers 7, 8, and 9, each including a primary winding 10 and a secondary winding 11, each of the windings 10 and 11 being tuned in a conventional manner to the frequency to be amplified. The grid circuits for the tubes 5 and 6 are identical and comprise a resistance 12 (3 megohms) connected between the grid and one terminal of the secondary winding 11, the resistance 12 being bypassed by a condenser 13 (100 mmf.). The plate circuits for each of the tubes 5 and 6 are also identical and consist of a connection from the plate of the tube to one terminal of the primary winding 10, the other terminal thereof being connected to the source of direct operating potential. The cathodes of each of the tubes 5 and 6 are preferably grounded, although in some cases a certain amount of fixed bias may be desirable in which case conventional cathode bias resistances and bypass condensers may be included in the cathode circuits.

The control potential which is used for automatic volume control is obtained by rectifying a portion of the output signal, and for this purpose a diode 14 or other suitable rectifier is employed. The plate of the diode 14 is connected to one terminal of the secondary winding 11 of the transformer 8 as by a conductor 15, and the cathode of the diode 14 is connected to the other terminal of that winding by a circuit including in series a bias battery 16 and a load resistance 17 (200,000 ohms) bypassed by a condenser 18 (0.002 mfd.). The cathode of the rectifier 14 is preferably grounded as indicated at 19.

Radio frequency signals applied across the diode 14 will cause a direct current to flow in the resistance 17 tending to shift the direct potential of the point marked 20 in the drawing in the negative direction an amount proportional to the magnitude of the signal applied to the diode 14. This direct control potential is applied to the grids of the tubes 5 and 6 by means of a circuit comprising a resistance 21 (80,000 ohms), a crystal unit 22 or other suitable asymmetric resistance, and an AVC bus 23. The AVC bus 23 is connected to the grid-return ends of the secondary windings 11 of the transformers 7 and 9 by means of conductors 24 and 25 respectively, a filtering resistance 26 (100,000 ohms) being interposed between conductors 23 and 24. The AVC bus 23 is bypassed to ground through a condenser 27 (0.05 mfd.) and a resistance 28 (150,000 ohms) connected in series therewith. The grid-return ends of the windings 11 of the transformers 7 and 9 are bypassed to ground through condensers 29 (0.002 mfd.). The crystal unit 22 is of a well known type which presents a resistance of the order of 40,000 ohms to electron flow in the direction of the arrowhead portion of the symbol used in the drawing for the crystal unit 22 (that is, when the point 20 is positive with respect to the AVC bus 23), and which presents a resistance of the order of 4 to 5 megohms to flow in the opposite direction. In lieu of a crystal, other asymmetric resistances may be used. For example, a diode may be substituted with its cathode connected to the AVC bus 23 and with resistances connected in series and parallel with the diode and having values of resistance selected to give the differential values noted above.

It will be noted that the automatic volume control circuit described differs from conventional circuits in the use of the crystal unit 22 and the grid resistance-condenser combinations 12—13. Before describing the operation of the circuit of this invention, it is advisable to consider the mode of operation of a conventional circuit (the illustrated circuit with elements 12, 13 and 22 omitted) during the reception of a steady signal (such as the desired navigation signals) accompanied by high level intermittent interferences (such as a strong Morse signal). At the instant of reception of a steep wave front signal such as a Morse dot or dash, the negative potential of the point marked 20 will rise abruptly. This results in a rapid charging of the condensers 29 and an immediate corresponding reduction in the gain of the amplifier.

When the Morse signal disappears, the high negative bias applied to the tubes 5 and 6 remains because of the relatively long time required to discharge the condensers 29 through the resistances 17, 21, and 26. An attempt to increase the speed of response sufficiently to restore normal gain for an appreciable part of the space between adjacent Morse signals results in such a degree of intercoupling between the amplifier stages as to cause motorboating and self-oscillation. Also, if the condenser-resistance combination 27—28 is given a long time constant, the initial build-up of control voltage will be too slow to prevent the peak signal from being passed through the amplifier.

The efficacy of the present invention resides in the cooperative relation between the limiter action of the resistance-condenser combinations 12—13 and the directional discriminatory action of the crystal unit 22. Briefly described, fast action at the instant the Morse signal is applied to input of the amplifier is obtained by the limiter action of the resistances 12 and condensers 13. It will be understood that the tubes 5 and 6 are normally operated at a negative grid bias which prevents the drawing of grid current. As soon, however, as a heavy Morse signal is received, the amplifier tube grids swing into the positive region and draw grid current. The resulting voltage drop across the resistances 12 shifts the grid voltage in the negative direction sufficiently to materially limit the gain of the tubes. The time constant of the resistance-condenser combination 12—13 is adjusted to give the desired limiter action, and to be short enough to discharge the condensers 13 in a time which is short compared with the duration of the period between Morse signals.

During the period of increasing control voltage and while the limiters are functioning, the crystal presents a resistance of the order of four or five megohms so that the remaining resistances in the control circuit may be made much lower than otherwise. During this period the control voltage rises slowly because of the relatively long time required to charge the condensers 29 through the high resistance of the crystal. At the instant the Morse signal disappears, the negative potential of the point marked 20 drops abruptly, the polarity of the voltage across the crystal unit 22 reverses, and the condensers 29 are discharged very rapidly through the low resistance presented by the crystal. This immediately removes the high negative bias and restores the gain of the amplifier to its normal value. The condenser-resistance combination 27—28 is given a relatively long time constant to hold the AVC bus 23 at an average value substantially equal to that which would obtain were there no interfering signals. The fluctuations resulting from the reception of the intermittent interfering signals are superimposed upon this average value.

A better understanding of the operation of the circuit will be facilitated by reference to Fig. 2 of the drawings, wherein graph A represents the positive half of the envelope of the received navigational signal, and curve B represents the positive half of the envelope of an interrupted continuous wave transmission such as a Morse signal. Curve C represents the voltage drop across the limiter resistances 12 of Fig. 1, and curve D represents the direct potential developed at the point 20 (the ungrounded end of the resistance 17). Curve E represents the negative voltage of the AVC bus 23, and curve F represents the D. C. voltage of the grids of the controlled amplifier tubes. This curve is the sum of curves C and E. Curve G represents the gain of the amplifier during the reception of the signals represented by curves A and B.

Fig. 2 represents the operation of the circuit under certain assumed operating conditions, i. e., it is assumed that the received navigational signals have a peak magnitude of about one volt, and that the amplifier tubes are normally biased about two volts negative. It is assumed that the tubes 5 and 6 are of a type which cut off at a negative bias of about five volts so that at biases in excess of five volts, the tube is blocked and the gain of the stage is reduced substantially to zero.

During the reception of the navigational signals only (see curve A), the grid swing of the amplifier tubes is entirely in the negative region and the tubes do not draw any grid current and there is consequently no direct potential drop across the grid limiter resistances 12. As soon, however, as a very strong interfering signal is received, as indicated at 50, curve B, the grids are swung into the positive region each positive half cycle of the received radio frequency. During these periods the grids draw grid current and produce a voltage drop across the resistances 12 as shown at 51 in graph C. This voltage is maintained as indicated at 52 for a short period of time by the condensers 13 which are connected in shunt with the grid resistance.

During a very short period of time amounting to but a fraction of a millisecond, and corresponding to perhaps one or two cycles of the received radio frequency signal, a high voltage is passed through the amplifier tubes 5 and 6 to the output 3. This pulse is transmitted to the equipment connected to the output 3, but the duration of the pulse is so short that it does not have any adverse effect on the operation of the following equipment. This high voltage signal is also applied to the rectifier 14 so as to produce an abrupt rise in the negative potential of the point 20 as is represented at 53 in curve D, and the potential is maintained as indicated at 54 by the condenser 18 which is connected in parallel with the resistance 17. The delay imposed by the high resistance of the rectifier 22 operating in the reverse direction causes the AVC bus voltage to rise very slowly, as is represented at 55 in curve E.

Curve F represents the potential applied to the grids of the tubes 5 and 6, and is characterized by a rapid negative shift 56 of considerable magnitude followed by a sustained negative voltage 57 of lesser value but exceeding the cut-off bias represented by the dashed line of curve F. From curve F it is seen that the operation of the amplifier is first blocked by the action of the grid limiters (as at 56), and is thereafter held in a blocked condition by the rise of the voltage on the AVC bus 23 (as at 57).

As soon, however, as the Morse transmission ceases, as indicated at 58, curve B, the condensers 29 discharge rapidly through the low resistance of the rectifier 22 operating in the forward direction so that the normal bias voltage is applied to the tubes 5 and 6 in a matter of a few milliseconds as is represented at 59, 60, and 61 in curves D, E, and F. Thus the amplifier gain is restored to substantially normal during the bulk of the period between the transmission of the individual Morse elements.

As is represented in curve G wherein the portions 62 represent zero gain periods and wherein the portions 63 represent periods of normal gain, the zero gain periods coincide with the actual transmission of the Morse signals, whereas the normal gain periods coincide with the idle periods between the Morse code elements.

Thus the circuit operates normally to maintain the gain of the amplifier at the desired value depending upon the strength of the navigation signals received. Whenever Morse signals are received, the gain of the amplifier is rapidly changed in synchronism with the Morse transmission, so that the amplifier is in effect inoperative during the transmission of the actual dots and dashes, but is operative at the normal level during the intervals between these parts of the Morse characters. In a navigation system of the character described in the aforementioned copending application, the phase meter employed as a position indicator has no return spring and develops no torque in the absence of a signal. Therefore, in the intervals between Morse elements, a signal is applied to the phase meter and the same operates to indicate correctly the measured phase relation. During the reception of dots and dashes, no signal is applied to the phase meter, no torque is developed, and the meter remains passively in the previous position. The phase meter accordingly gives a steady indication of the phase relationship as measured during the intervals between Morse elements.

The above described desirable mode of operation cannot be satisfactorily obtained with a navigation receiver through the use of the limiters alone because in order to obtain the regulating action required, the tubes 5 and 6 would have to be biased to a point where they would draw grid current at normal signal levels. This would introduce uncontrollable phase shifts which would result in erroneous indications by the phase meter.

The effectiveness of the described circuit may be seen from the results of a test in which a receiver utilizing the described circuit operated to satisfactorily receive navigation signals and provide a correct position indication despite the deliberate introduction on one of the navigational aid frequencies of a square wave type signal consisting of on periods of 0.020 second and off periods of 0.007 second at a peak level of forty times the level of the received navigational signals.

From the foregoing it will be observed that there has been described an improved automatic volume control circuit which finds particular utility when used with receivers intended for use with radio navigational aids of the continuous-wave phase-comparison type. It will be observed that the described circuit normally operates in the same manner as conventional circuits to maintain a desired output level, and in addition, permits the receiver to operate in the presence of intermittent interfering signals having a level many times higher than the level of the signals desired to be received. It will be realized that this desirable result accrues from the use of the crystal unit in the AVC control circuit together with the limiter circuits in the grid circuits of at least one of the controlled tubes.

While there has been shown and described the preferred embodiment of this invention, the same is not to be limited to the details of construction described herein, except as defined in the appended claims.

I claim:

1. In an automatic volume control system, the combination of: a plurality of vacuum tubes connected in a multi-stage amplifier circuit; a rectifier connected to said amplifier circuit for developing a direct control potential; control circuit means connecting one side of said rectifier to the grids of said tubes for applying said control potential to said grids; and asymmetric resistance in said control circuit presenting to current flowing in one direction a resistance many times greater than is presented to current flowing in the opposite direction; a load circuit comprising an impedance having a given time constant connected to draw current from said rectifier through said asymmetric resistance; and a limiter comprising a resistance in series with at least one of said grids and a condenser connected in parallel with said resistance to provide a time constant different than said given time constant.

2. The combination defined in claim 1 in which said asymmetrical resistance comprises a crystal unit.

3. The combination defined in claim 1 in which said asymmetrical resistance is arranged to present its highest resistance to current flowing as a result of a shift of said control potential in the negative direction.

4. In an automatic volume control system, the combination of: a plurality of vacuum tubes connected in a multi-stage amplifier circuit; means connected to said amplifier circuit for developing a direct control potential; an AVC bus for applying said direct control potential to the grids of said vacuum tubes; means associated with at least one of said tubes providing a limiting action and having a given time constant; an asymmetrical resistance connected between said first named means and said AVC bus, said asymmetrical resistance presenting to current flowing in one direction a high resistance many times higher than a low resistance presented thereby to current flowing in the opposite direction; and a load circuit connected to draw current from said first named means through said asymmetrical resistance, said load circuit including a condenser providing a greater time constant with said high resistance which is long relative to said given time constant and a shorter time constant with said low resistance which is short relative to said given time constant.

5. In an automatic volume control system, the combination of: a plurality of vacuum tubes connected in a multi-stage amplifier circuit; means connected to said amplifier circuit for developing a direct control potential; an AVC bus for applying said direct control potential to the grids of said vacuum tubes; means associated with at least one of said tubes providing a limiting action and having a given time constant; asymmetrical resistance connected between said first named means and said AVC bus, said asymmetrical resistance presenting to current flowing in one direction a high resistance many times higher than a low resistance presented thereby to current flowing in the opposite direction; a load circuit connected to draw current from said first named means through said asymmetrical resistance, said load circuit including a condenser providing a greater time constant with said high resistance which is long relative to said given time constant and a short time constant with said low resistance which is short relative to said given time constant; and a stabilizing circuit comprising a resistance and a condenser connected in series to draw current from said AVC bus, said stabilizing circuit having a time constant which is long relative to said greater time constant.

WILLIAM JOSEPH O'BRIEN.

REFERENCES CITED

The following references are of record in the file of this patent:

UNITED STATES PATENTS

| Number | Name | Date |
|---|---|---|
| 2,189,925 | Reinken | Feb. 13, 1940 |
| 2,286,106 | Ritzmann | June 9, 1942 |
| 2,294,862 | Hadfield | Sept. 1, 1942 |
| 2,332,536 | Schlegel | Oct. 26, 1943 |
| 2,390,856 | Thompson | Dec. 11, 1945 |

FOREIGN PATENTS

| Number | Country | Date |
|---|---|---|
| 604,499 | Great Britain | July 5, 1948 |